US012613224B2

(12) United States Patent
Zach et al.

(10) Patent No.: US 12,613,224 B2
(45) Date of Patent: Apr. 28, 2026

(54) METHOD AND DEVICE FOR DETECTING AND LOCATING A FAULT POINT OF A HOUSING

(71) Applicant: MUSE Electronics GmbH, Vienna (AT)

(72) Inventors: Gerald Zach, Obersdorf (AT); Max Rainer, Vienna (AT); Markus Kirschner, Mödling (AT)

(73) Assignee: MUSE Electronics GmbH, Vienna (AT)

( * ) Notice: Subject to any disclaimer, the term of this patent is extended or adjusted under 35 U.S.C. 154(b) by 433 days.

(21) Appl. No.: 18/559,388

(22) PCT Filed: May 3, 2022

(86) PCT No.: PCT/EP2022/061817
§ 371 (c)(1),
(2) Date: Nov. 7, 2023

(87) PCT Pub. No.: WO2022/233850
PCT Pub. Date: Nov. 10, 2022

(65) Prior Publication Data
US 2024/0230598 A1     Jul. 11, 2024

(30) Foreign Application Priority Data
May 7, 2021     (EP) .................................... 21172680

(51) Int. Cl.
*G01N 29/12*          (2006.01)
*G01N 29/42*          (2006.01)
(Continued)

(52) U.S. Cl.
CPC ............. *G01N 29/12* (2013.01); *G01N 29/42* (2013.01); *G01N 29/4436* (2013.01);
(Continued)

(58) Field of Classification Search
CPC .... G01N 29/12; G01N 29/42; G01N 29/4436; G01N 29/50; G01N 2291/0289; G01N 2291/105; G08B 13/1609
See application file for complete search history.

(56) References Cited

U.S. PATENT DOCUMENTS

2017/0338804 A1 * 11/2017 Gunther ............... G08B 21/182
2020/0003646 A1     1/2020 Krywyj et al.

FOREIGN PATENT DOCUMENTS

WO          2015/065873 A2     5/2015
WO          2022/233850 A1     11/2022

OTHER PUBLICATIONS

Extended European Search Report received for European Patent Application No. 21172680.7, mailed on Oct. 22, 2021, 10 pages (Official Copy only).

(Continued)

*Primary Examiner* — Xin Y Zhong
(74) *Attorney, Agent, or Firm* — Weaver IP L.L.C.

(57) ABSTRACT

A method and device for detecting and locating a fault of a housing comprising: arranging at least two loudspeakers and at least two microphones therein; for each pairing of loudspeaker and microphone and a housing with no faults: measuring a reference frequency response of the sound transmission from the loudspeaker to the microphone; for each pairing and a housing with faults: measuring a present frequency response of the sound transmission; for each pairing: determining a difference frequency response as the difference between the present frequency response and the reference frequency response; for each possible combination of two pairings: calculating a correlation measure between the difference frequency responses of the pairings; and determining the combination with the highest correlation measure and, if the same loud-speaker or the same micro- (Continued)

phone appears in the pairings of this combination, then locating the fault as proximate to this loudspeaker or microphone.

16 Claims, 4 Drawing Sheets

(51) Int. Cl.
  *G01N 29/44*       (2006.01)
  *G01N 29/50*       (2006.01)
(52) U.S. Cl.
  CPC ..... *G01N 29/50* (2013.01); *G01N 2291/0289* (2013.01); *G01N 2291/105* (2013.01)

(56)          References Cited

OTHER PUBLICATIONS

International Search Report and Written Opinion received for PCT Patent Application No. PCT/EP2022/061817, mailed on Aug. 12, 2022, 11 pages (Official Copy only).
International Preliminary Report on Patentability received for PCT Patent Application No. PCT/EP2022/061817, mailed on Nov. 16, 2023, 7 pages.

* cited by examiner

METHOD AND DEVICE FOR DETECTING AND LOCATING A FAULT POINT OF A HOUSING

CROSS-REFERENCE TO RELATED APPLICATIONS

This application is a National Phase application of International Application No. PCT/EP2022/061817 filed May 3, 2022 which claims priority to the European Patent Application No. 21 172 680.7 filed May 7, 2021, the disclosures of which are incorporated herein by reference.

TECHNICAL FIELD

The present disclosed subject matter relates to methods and devices for detecting and locating faults in a housing using sound waves.

BACKGROUND

Monitoring the integrity of device housings is of strategic importance for security-critical applications in the government, industrial or military sectors, in particular for electronic devices such as servers, computers, laptops, notebooks and smartphones, as the first line of defense against hacker attacks. Manipulations to a housing, for example by drilling, inserting foreign objects such as probes or transmitters, or destroying seals inside the housing, may be an unmistakable sign of such hacker attacks. Such physical manipulations often remain undetected in the case of a large number of device housings to be monitored, e.g. in server cabinets, or in the field, or if they are not visible from the outside. Damage during use in the field, which leads to leaks, for example, also often remains hidden.

The use of sound waves in the form of structure-borne sound or airborne sound is known for monitoring the integrity of structures. For example, distributing multiple loudspeaker/microphone pairs across an interior to be monitored is described in US 2017/0338804 A1. The airborne-sound transmission path of each loudspeaker/microphone pair is simulated by a connected evaluation circuit as an adaptive digital filter. If the adaptive digital filter changes too much compared to an initial state, a disturbance of the interior is detected and located as lying in the vicinity of the affected loudspeaker/microphone pair.

However, the known acoustic fault detection methods are not able to locate the detected faults more precisely and reliably, so that they may be found quickly.

BRIEF SUMMARY

The aim of the disclosed subject matter is to create methods and devices for detecting faults and which are capable of reliably locating the detected faults.

This goal is achieved in a first aspect with a method for detecting and locating a fault in a housing, in particular for an electronic device, comprising:

arranging at least two loudspeakers and at least two microphones in the interior of the housing;

for each possible pairing of a loudspeaker and microphone: measuring a reference frequency response of the sound transmission from the loudspeaker to the microphone of this pairing;

for each pairing: measuring a present frequency response of the sound transmission from the loudspeaker to the microphone of this pairing at a later point in time;

for each pairing: determining a difference frequency response as the difference between the present frequency response of this pairing and the reference frequency response of this pairing;

for at least one pairing: determining a detection measure of the difference frequency response of this pairing and, if this at least one detection measure satisfies a predetermined detection criterion:

detecting a fault, for each possible combination of two pairings: calculating a correlation measure between the difference frequency responses of the pairings of this combination, determining the combination with the highest correlation measure and, if the same loudspeaker or the same microphone appears in the two pairings of this combination, then localizing the fault as being closer to this loudspeaker or microphone than to any other loudspeaker or microphone.

The method according to the disclosed subject matter allows for a reliable locating of a fault in the area surrounding one of the loudspeakers or microphones. If a correspondingly large number of loudspeakers or microphones are distributed largely uniformly across the interior of the housing, a correspondingly high spatial resolution of the location may be achieved.

Any correlation measure may be used as a correlation measure for the agreement of two difference frequency responses, for example, a sum of the (frequency-by-frequency) absolute values or squared differences or an L1, L2 or Lp norm of the differences between the two respectively considered difference frequency responses, a scalar product of these difference frequency responses, etc. The correlation measure is optionally determined from a cross-correlation of the difference frequency responses in a selected frequency band, which allows for a reliable location. It is particularly favorable if the frequency band is 250 Hz to 2 kHz, optionally 350 Hz to 1.1 kHz. Evaluation in these frequency bands has proven to be a particularly reliable location criterion.

In another optional embodiment of the disclosed subject matter, only those combinations that exceed a correlation threshold value are considered in the determination of the combination with the highest correlation measure. The reliability of the location may thus be further increased.

For example, the maximum amplitude of the difference frequency responses of all pairings, if this exceeds a threshold value, might be used as a detection criterion for the detection of a fault. The detection criterion is optionally satisfied when the total signal energy of at least one difference frequency response exceeds a detection threshold value.

The reference frequency response and the present frequency response of the sound transmission between the loudspeaker and the microphone of a pairing may be measured in a variety of ways. In one first embodiment of the disclosed subject matter, the respective frequency response is measured using chirps emitted by the loudspeaker. In a second embodiment, the respective frequency response may be measured using Dirac pulses emitted by the loudspeaker. The measurement using chirps takes somewhat longer, but leads to more precise results and the sound power received by the microphone and recorded over time directly reflects the frequency response if the chirp is swept—e.g., linearly or logarithmically—over the frequency. The measurement using Dirac pulses is faster, but requires a subsequent Fourier transformation to calculate the frequency response from the impulse response recorded by the microphone over time.

In each of the specified embodiments, the reliability of the locations may be increased even further if the reference frequency responses and the present frequency responses are respectively averaged over a plurality of individual measurements, for example, over two or more individual measurements that directly follow one another.

In a second aspect, the disclosed subject matter creates a device for detecting and locating a fault in a housing, in particular for an electronic device, comprising:

at least two loudspeakers and at least two microphones for arrangement in the interior of the housing; and a signal generator connected to the loudspeakers and an evaluation circuit connected to the microphones;

wherein the evaluation circuit is configured to:

for each possible pairing of a loudspeaker and microphone: measure a reference frequency response of the sound transmission from the loudspeaker to the microphone of this pairing, for each pairing: measure a present frequency response of the sound transmission from the loudspeaker to the microphone of this pairing at a later point in time, for each pairing: determine a difference frequency response as the difference between the present frequency response of this pairing and the reference frequency response of this pairing, for at least one pairing: determine a detection measure of the difference frequency response of this pairing and, if this at least one detection measure satisfies a predetermined detection criterion:

to detect a fault, and for each possible combination of two pairs: to calculate a correlation measure between the difference frequency responses of this combination, and then to determine the combination with the highest correlation measure and, if the same loudspeaker or the same microphone appears in the two pairs of this combination, then to localize the fault as being closer to this loudspeaker or microphone than to any other loudspeaker or microphone.

Reference is made to the above statements regarding the method carried out by the device with regard to the advantages and optional configurations of the device according to the disclosed subject matter.

BRIEF DESCRIPTION OF THE DRAWINGS

The disclosed subject matter is subsequently explained in greater detail by way of exemplary embodiments depicted in the accompanying drawings. As shown in the drawings.

DETAILED DESCRIPTION

Figure 1:
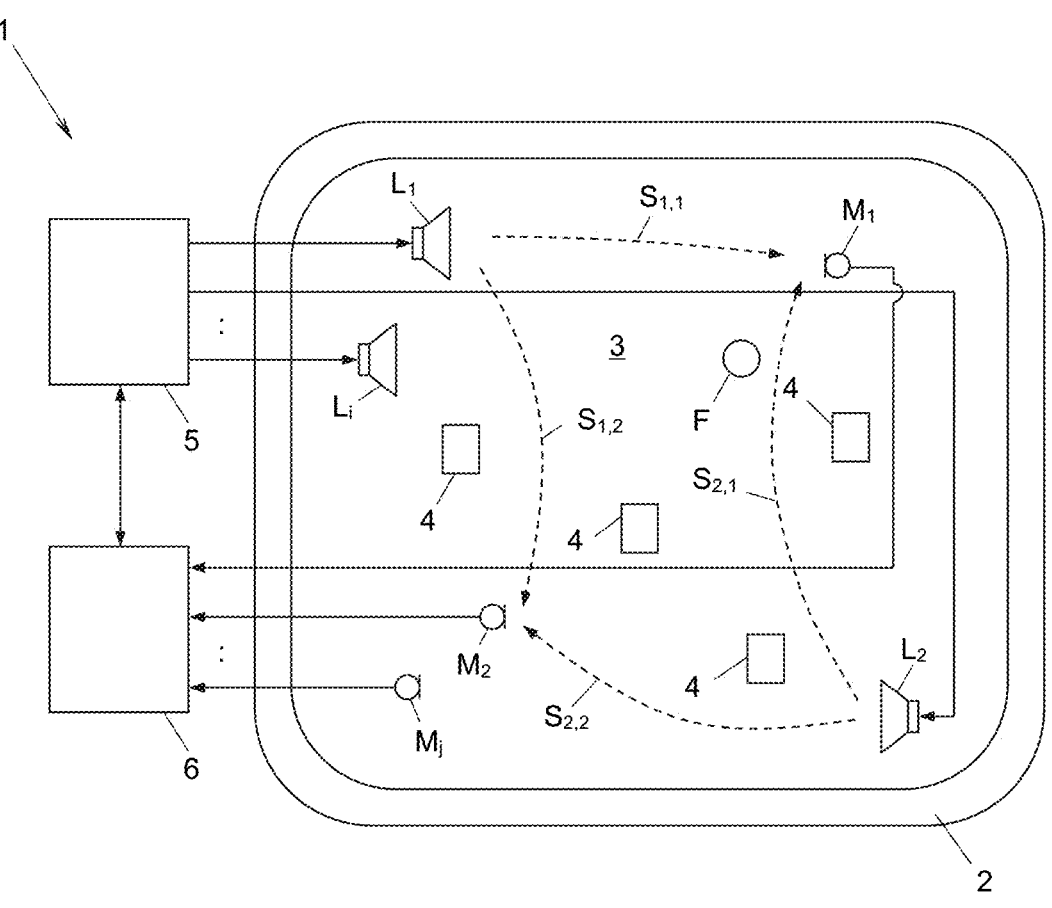
FIG. 1 a block diagram of the device of the disclosed subject matter for carrying out the method of the disclosed subject matter, which is installed in a device housing to be monitored.
Figure 2:
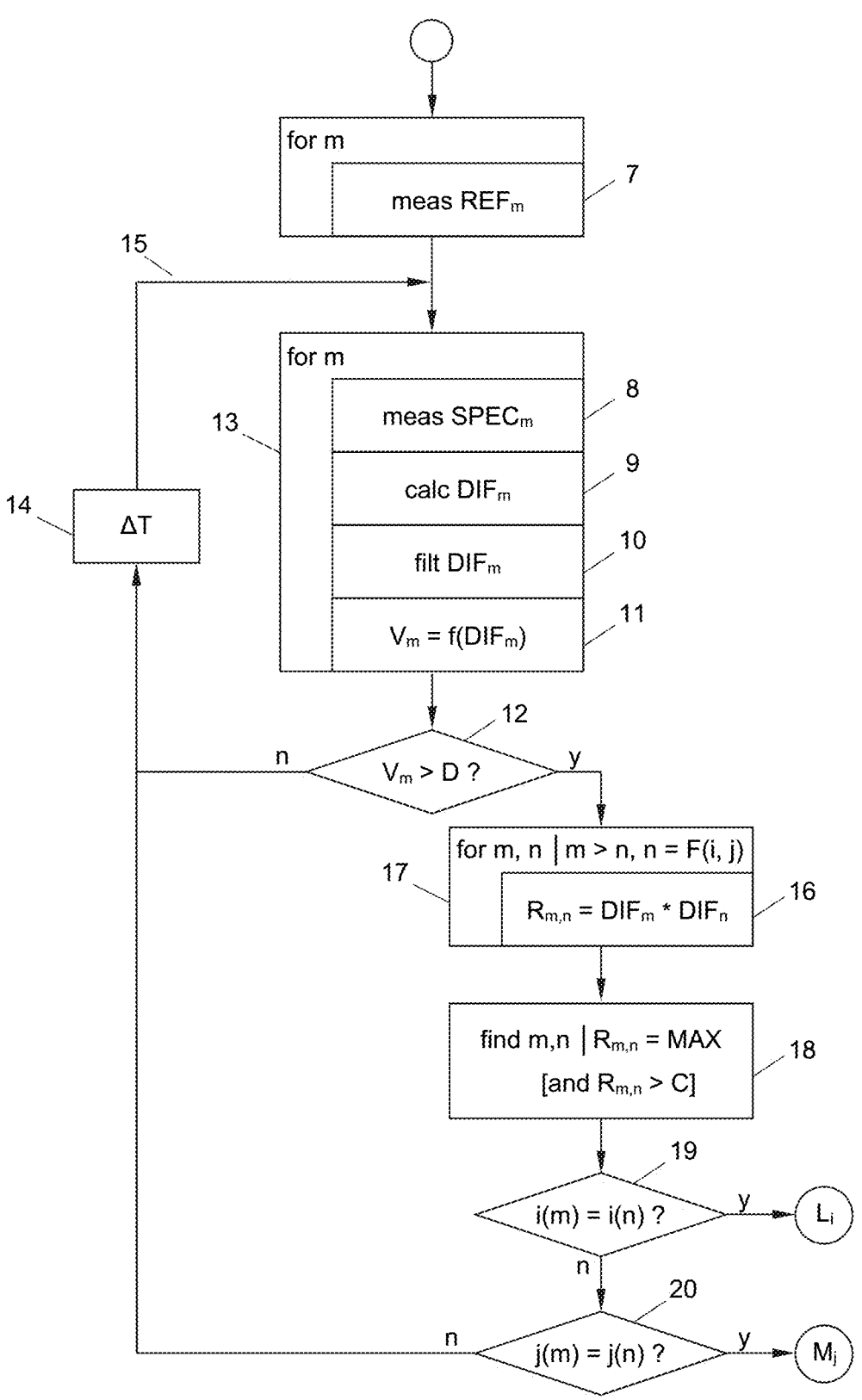
FIG. 2 a flow chart of the method of the disclosed subject matter.

FIG. 1 shows a device 1, which is simultaneously suited for carrying out the method shown in FIG. 2. Device 1 is used to monitor the integrity of a housing 2 in order to detect and classify faults F thereon.

Housing 2 has an interior 3 for accommodating technical components 4. For example, housing 2 is the housing of a computer, server, notebook, laptop, smartphone or the like. Housing 2 is not necessarily closed. Interior 3 is filled with a gas for sound propagation therein, usually simply with ambient air, which is either pre-filled or penetrates through openings of housing 2 into interior 3.

Faults F, for which housing 2 is to be monitored, may be either defects, that is, locations where something is "missing" in or on housing 2, such as a hole, a gap or a crack in the wall of housing 2, a technical component 4 removed from housing 2, a removed or broken seal or the like. Or fault F is a foreign object, thus something additional in housing 2, for example a probe, a tap wire, a transmitter or the like. If a component 4 changes its position in the housing, e.g., becomes loose and shifts due to an impact, then a void occurs in its original location and it forms a foreign object in its new location.

For the detection and locating of faults F, device 1 comprises two or more loudspeakers $L_i$ (i=1, 2, . . . , I) arranged in interior 3 of housing 2 and, spaced apart from these, two or more microphones $M_j$ (j=1, 2, . . . , J). It is favorable to distribute loudspeakers $L_i$ and, in particular, microphones $M_j$ as uniformly as possible across interior 3 since the locating of a fault F is carried out later in the spatial resolution of the respective areas surrounding microphones $M_j$. Number I of loudspeakers $L_i$ and number J of microphones $M_j$ do not necessarily need to be identical.

For each possible pairing (i, j) of a loudspeaker $L_i$ and a microphone $M_j$, a sound transmission $S_{i,j}$ may be carried out between them. Sound transmission $S_{i,j}$ ("acoustic transmission path") comprises both the direct sound from loudspeaker $L_i$ to microphone $M_j$ and any form of indirect sound, which arrives at respective microphone $M_j$ from respective loudspeaker $L_i$ of pairing (i, j) due to reflections on the inner walls of housing 2 or on components 4 in interior 3 of housing 2. In order to record as much indirect sound as possible and thus extensively cover interior 3, loudspeakers $L_i$ and/or microphones $M_j$ may be omnidirectional or have correspondingly broad directional characteristics.

Each loudspeaker $L_i$ is connected to the output of a signal generator 5 and each microphone $M_j$ is connected to the input of an evaluation circuit 6. Signal generator 5 and evaluation circuit 6 may communicate with one another for the purpose of synchronization. Signal generator 5 may be implemented together with evaluation circuit 6, for example, as a microprocessor, or may be implemented in software on such a microprocessor. Signal generator 5 and evaluation circuit 6 may also be realized using already existing technical components 4 of the device in housing 2.

With reference to FIG. 2 in a first step 7 a reference frequency response $REF_{i,j}$ of sound transmission $S_{i,j}$ between this speaker $L_i$ and microphone $M_j$ is measured with the aid of a device 1 to test a "sound", i.e., non-manipulated housing 2 without faults F for each possible pairing (i, j) of a loudspeaker $L_i$ and a microphone $M_j$. For the sake of simplicity in the following, set $\{(i, j)\}$ of all possible pairings (i, j) is numbered consecutively using index m (m=1, 2, . . . , M), i.e., a mapping function $\Phi$ is selected between pairings (i, j) and indices m=$\Phi$(i, j). Mapping function $\Phi$ may be chosen arbitrarily as long as it is unique and bijective. Examples for mapping function $\Phi$ are m=i· (J−1)+j or m=i+j·(I−1).

For example, in the case of two loudspeakers L1, L2 and two microphones M1, M2, there are four possible pairings (i, j), namely: (1, 1), (2, 1), (1, 2), (2, 2), and these are numbered with indices m=1, 2, 3, 4 as follows:

TABLE 1

| Pairing m | (i, j) |
|-----------|--------|
| 1 | (1, 1) |
| 2 | (2, 1) |
| 3 | (1, 2) |
| 4 | (2, 2) |

Figure 3:
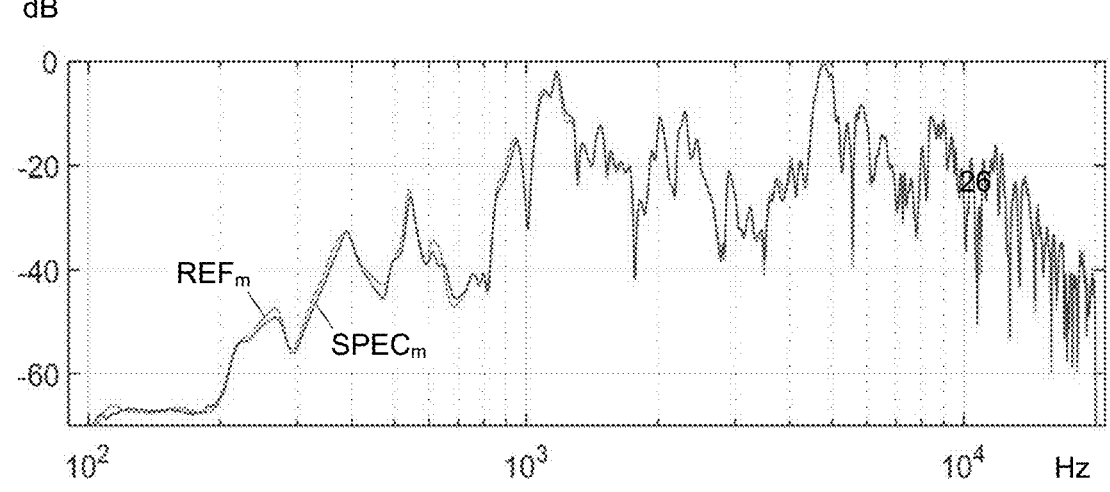
FIG. 3 an example of a reference frequency response and a present frequency response in an amplitude/frequency graph.

Reference frequency response $REF_{i,j}$ of a pairing (i, j) with index m will therefore be referred to in the following as $REF_m$, see FIG. 3.

There are a plurality of possibilities for the measurement of reference frequency response $REF_m$ of the sound transmission $S_{i,j}$. On the one hand, signal generator 5 may generate a chirp, i.e., a monofrequency signal, which is emitted by respective loudspeaker $L_i$ and whose frequency is swept over the frequency range to be measured over time. The sound amplitude or power recorded by respective microphone $M_j$ is logged over time and directly reproduces reference frequency response $REF_m$ over the frequency. Or, signal generator 5 generates a Dirac pulse, which respective loudspeaker $L_i$ emits, and the impulse response recorded by respective microphone $M_j$ over time is then subjected to a Fourier transformation in order to determine reference frequency response $REF_m$ over the frequency. The emitted signal might also be a coded signal, for example, it is "chopped" again with a higher-frequency signal (e.g., 40 kHz) and thus becomes a pseudo-noise signal. Measured reference frequency response $REF_m$ is stored for subsequent fault monitoring, for example, in a memory of evaluation unit 6.

Reference frequency response $REF_m$ is respectively determined, for example, in the audible acoustic frequency range of 20 Hz-20 KHz, but may also, alternatively or additionally, include the infrasonic range below 20 Hz or the ultrasonic range above 20 KHz, e.g., up to 100 KHz or 200 KHz. The selection of the frequency range is determined by, among other things, the housing dimensions at the lower end and the size of faults that may still be detected at the upper end.

It is clear that, in step 7, reference frequency responses $REF_m$ are respectively measured one after the other in order to be able to measure sound transmission paths $S_{i,j}$ separately from one another in an acoustically clean manner.

Optionally, each reference frequency response $REF_m$ may be averaged from a plurality of individual measurements, i.e., by means of multiple consecutive chirps or Dirac pulses. It is also possible to filter and/or weight each reference frequency response $REF_m$ before it is used further, for example to filter out impact noise below e.g. 200 Hz, to smooth out outliers or notches in measured values, or to filter out frequency ranges in which the received signal of a microphone $M_j$ delivers a signal-to-noise ratio that is too low for meaningful evaluations.

In order to detect the occurrence of a fault F and then locate it, for each pairing (i, j) a present frequency response $SPEC_m$ (FIG. 3) of sound transmission $S_{i,j}$ is then measured between respective loudspeaker $L_i$ and the respective microphone $M_j$ at any later point in time in a step 8. In measurement step 8, the same measurement method is used that was used for measuring reference frequency response $REF_m$ in step 7 in order to make it possible to compare present frequency response $SPEC_m$ and reference frequency response $REF_m$ with one another.

During measurement 8 of present frequency response $SPEC_m$, the (optional) averaging over multiple individual measurements or the (optional) filtering, weighting or smoothing may be omitted in order to save computing time.

Present frequency responses $SPEC_m$ are again measured one after the other in step 8 in order to separate the measurement of sound transmissions $S_{i,j}$ of pairings m from one another in an acoustically clean manner.

Figure 4:
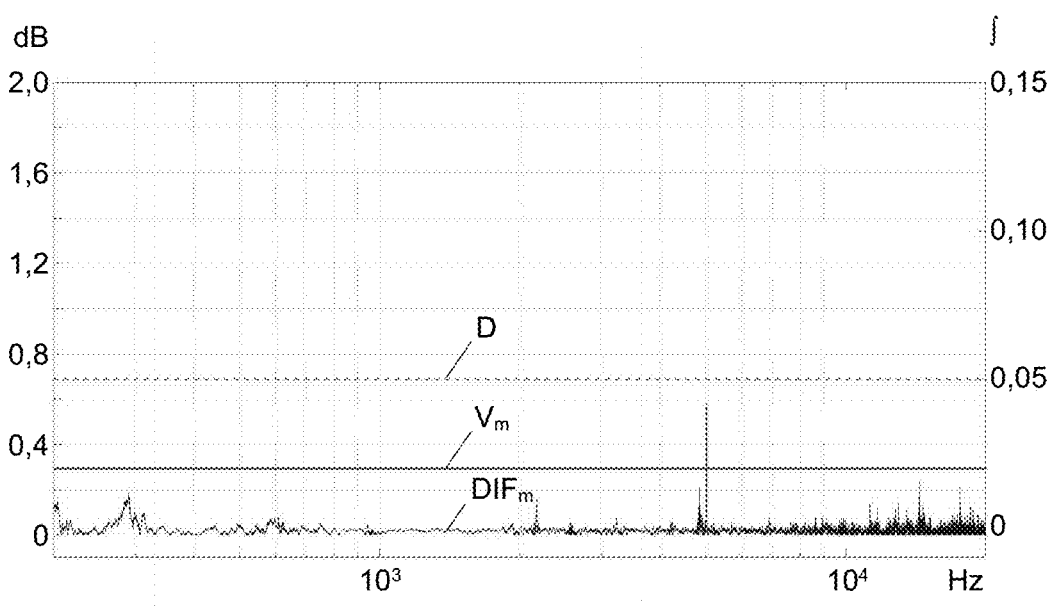
FIG. 4 an example of a difference frequency response for a housing without a fault in an amplitude/frequency graph.
Figure 5:
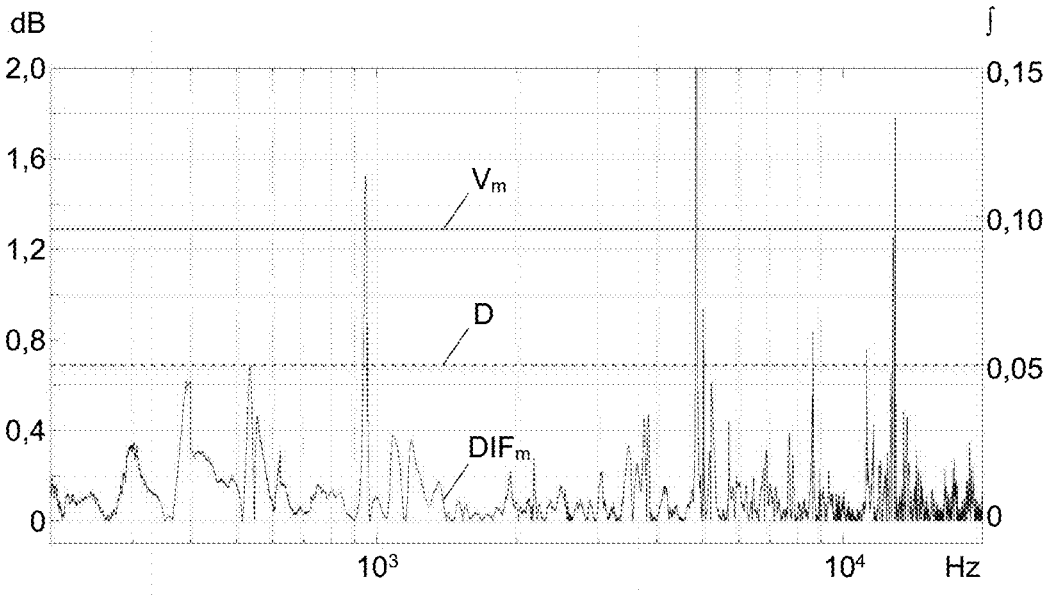
FIG. 5 an example of a difference frequency response for a housing with a fault in an amplitude/frequency graph.

After measuring present frequency response $SPEC_m$ in step 9 for each pairing m=$\Phi$(i, j), a difference frequency response $DIF_m$ (FIGS. 4, 5) is determined from the deviation of respective present frequency response $SPEC_m$ from respectively associated reference frequency response $REF_m$, i.e., related to this same pairing m. Each difference frequency response $DIF_m$ may be, for example, a simple (frequency-by-frequency) difference (subtraction) between present frequency response $SPEC_m$ and reference frequency response $REF_m$ of pairing m, or also another measure of deviation, for example the (frequency-by-frequency) absolute values or squared differences, or the like, between two curves $REF_m$ and $SPEC_m$. In an optional step 10, each difference frequency response $DIF_m$ may be weighted or filtered, if desired.

Subsequently, in step 11, a global measure $V_m$ (FIGS. 4, 5) of at least one or each difference frequency response $DIF_m$ is calculated, and is checked against a detection criterion in step 12 in order to detect the presence of a fault F. Measure $V_m$ may be, for example, the maximum amplitude value of difference frequency response $DIF_m$, an average of this difference frequency response $DIF_m$ after it has been subjected to absolute value formation, or total "signal energy" E of respective difference frequency response $DIF_m$. The latter may be calculated, for example, by first subjecting difference frequency response $DIF_m$ to an absolute value formation and then integrating it over the entire frequency range of interest, for example 20 Hz to 20 KHz.

Steps 8-11 are carried out for each pairing m=$\Phi$(i, j), see loop 13. Alternatively, each of steps 8-11 might also have its own loop 13.

Afterwards, the transition to comparison step 12 takes place. The comparison and thus detection criterion of step 12 is satisfied if, for example, at least one, or all, of measure(s) $V_m$ exceed(s) a detection threshold value D. It is clear that a plurality of measures $V_m$ may also be evaluated together in step 12. For example, a sum or an average of all measures $V_m$ may be compared to detection threshold value D.

If the detection criterion of comparison step 12 is not satisfied (branch "n"), then no fault F was detected and the method returns, if necessary, after the expiration of a waiting time ΔT in step 14, in a loop 15 back to first step 8 of loop 13 for a renewed measuring of present frequency responses $SPEC_m$. Waiting time ΔT may be, for example, a few seconds or minutes so that housing 2 is periodically monitored at these intervals in loop 15.

If, on the other hand, comparison step 12 yields the result that the detection criterion is satisfied (branch "y"), then the presence of a source of fault F has been recognized, and a transition is carried out to location section 16-19 of the method.

Detection threshold value D may be selected empirically, and may optionally also be adaptively tracked with the aid of an automatic control system: in the error-free case, i.e., without a fault F, it may, for example, be reduced to such an extent that even small changes in housing 2, i.e. the occurrence of small faults F, may be detected.

For every possible combination (m, n) of two pairings (m, n): a correlation measure $R_{m,n}$ is calculated between difference frequency responses $DIF_m$ and $DIF_n$ of the pairings of this combination (m, n) in a first step 16 in location section 16-19. Index n thereby designates a different pairing from the set {m=1, 2, . . . , M} than index m, i.e., n≠m. Furthermore, for symmetrical correlation measures $V_m$, $R_{m,n}=R_{n,m}$, so that there are a total of $$\binom{M}{2}$$

possible combinations for M pairings, and thus correlation measures $R_{m,n}$. Step 16 is therefore carried out $$\binom{M}{2}$$

times in loop 17, i.e., for all m, n for which m>n.

Figure 6:
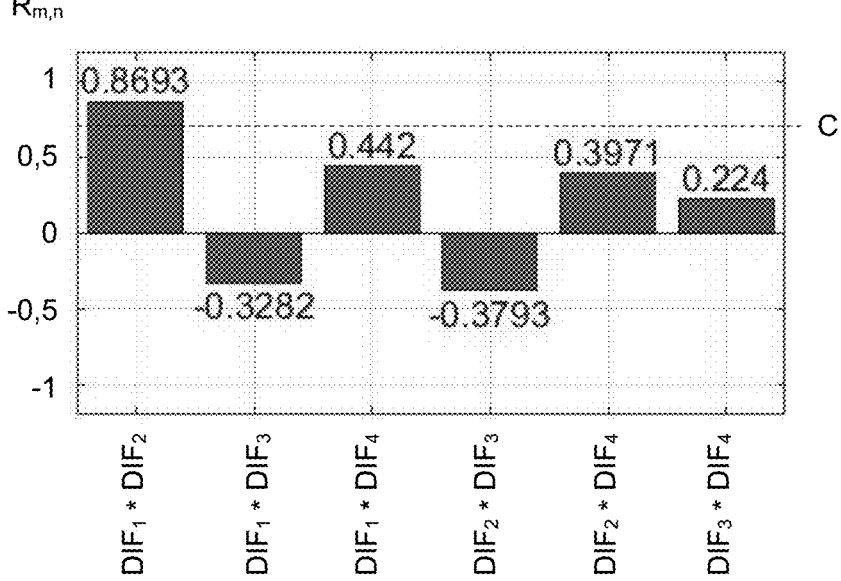
FIG. 6 an example for correlation measures of difference frequency responses from six possible combinations of four possible pairs of loudspeakers and microphones in the case of a device of the disclosed subject matter with two loudspeakers and two microphones.

For a device 1 with two speakers L1, L2 and two microphones M1, M2, thus where M=4 possible pairings m or n, FIG. 6 shows all $$\binom{4}{2}=6$$

possible combinations, for which a correlation measure $R_{m,n}$ of respective difference frequency responses $DIF_m$ and $DIF_n$ was respectively calculated, see Tab. 2 below:

TABLE 2

| Combination | (m, n) |
|---|---|
| 1 | (1, 2) |
| 2 | (1, 3) |
| 3 | (1, 4) |
| 4 | (2, 3) |
| 5 | (2, 4) |
| 6 | (3, 4) |

Correlation measure $R_{m,n}$ between two difference frequency responses $DIF_m$, $DIF_n$ may be calculated in any way known in the art as long as it is a measure of the deviation between two difference frequency responses, for example, a sum of absolute values or squared differences, an L1, L2 or Lp norm of a difference function $DIF_m-DIF_n$, a scalar product from the difference frequency responses $DIF_m$, $DIF_n$, etc. In the example shown, correlation measure $R_{m,n}$ is determined from a cross-correlation of two, respectively considered difference frequency responses $DIF_m$ and $DIF_n$, in particular from the cross-correlation $$R_{m,n}(\tau) = \int_f DIF_m(f) \cdot DIF_n(f+\tau)\, df \qquad (1)$$

for τ=0, namely, either over the entire range of frequency f or optionally in a selected frequency band. The selected frequency band is, for example, 250 Hz to 2 KHz, in particular 350 Hz to 1.1 KHz.

Subsequently, that combination (m, n), which has the highest correlation measure $R_{m,n}$ of all combinations, is determined in step 18. In the example of FIG. 6, this is the first combination (1, 2).

Previously, all reference frequency responses $REF_m$, present frequency responses $SPEC_m$, and difference frequency responses $DIF_m$ were measured and evaluated as real values with regard to their amounts (amplitudes), i.e., without taking their phases into account; however, they might optionally also be measured and evaluated in a complex manner. In this case, for example, the magnitude of the cross-correlation $$R_{m,n}(\tau) = \left| \int_f DIF_m^*(f) \cdot DIF_n(f+\tau)\, df \right| \qquad (2)$$

with τ=0, where * denotes the complex conjugate, may be used as correlation measure $R_{m,n}$ for evaluation in step 18.

When searching for the highest correlation measure in step 18, it is optional that only those correlation measures that exceed a correlation threshold value C (FIG. 6) may be considered. Correlation threshold value C may be determined empirically. For a corresponding normalization of correlation measure $R_{m,n}$ to the range −1 . . . +1 (see FIG. 6), correlation threshold value C is, for example, in the range from 0.5 to 1, in particular approximately 0.75.

Loudspeaker and microphone indices i, j of those two pairings m, n, which form combination (m, n) determined in step 18, are subsequently examined in comparison steps 19 and 20.

For this purpose, first comparison step 19 examines whether the same loudspeaker index i occurs in both pairings m, n of the combination determined in step 18; and second comparison step 20 determines whether the same microphone index j respectively occurs in both of these pairings m, n. If comparison step 19 yields a result of "yes" (branch "y"), then fault F is located as being in the vicinity of loudspeaker $L_i$, and if comparison step 20 yields a result of "yes" (branch "y") then fault F is located as being in the vicinity of microphone $M_j$. It is clear that the order of comparison steps 19 and 20 is arbitrary. The term "vicinity" of loudspeaker $L_i$ or microphone $M_j$ is understood to mean that fault F is closer to this loudspeaker $L_i$ or microphone $M_j$ than to any other loudspeaker $L_{k\neq i}$ or microphone $M_{k\neq j}$.

If both comparison steps 19 and 20 yield a result of "no" (branches "n"), then the location is ambiguous and the method optionally returns, and, if necessary, after the expiration of waiting time ΔT in step 14, back to first step 8 of loop 13.

The disclosed subject matter is not limited to the depicted embodiments, but comprises all variants, modifications and combinations thereof which fall within the scope of the appended claims.

What is claimed is:

1. A method for detecting and locating a fault of a housing, comprising:

arranging at least two loudspeakers and at least two microphones in an interior of the housing;

for each possible pairing of a loudspeaker and microphone:

measuring a reference frequency response of a sound transmission from the loudspeaker to the microphone of this pairing;

for each pairing: measuring a present frequency response of a sound transmission from the loudspeaker to the microphone of this pairing at a later point in time;

for each pairing: determining a difference frequency response as a difference between the present frequency response of this pairing and the reference frequency response of this pairing;

for at least one pairing: determining a detection measure of the difference frequency response of this pairing and, if this at least one detection measure satisfies a predetermined detection criterion:

detecting a fault, for each possible combination of two pairings: calculating a correlation measure between the difference frequency responses of the pairings of this combination, determining the combination with the highest correlation measure and, if the same loudspeaker or the same microphone appears in the two pairings of this combination, then localizing the fault as being closer to this loudspeaker or microphone than to any other loudspeaker or microphone.

2. The method according to claim 1, wherein the correlation measure is determined from a cross-correlation of the difference frequency responses in a selected frequency band.

3. The method according to claim 2, wherein the frequency band is 250 Hz to 2 KHz.

4. The method according to claim 1, wherein during determining the combination with the highest correlation measure, only those combinations are considered that exceed a correlation threshold value.

5. The method according to claim 1, wherein the detection criterion is satisfied when a total signal energy of at least one difference frequency response exceeds a detection threshold value.

6. The method according to claim 1, wherein the respective frequency response is measured using a chirp emitted by the loudspeaker.

7. The method according to claim 1, wherein the respective frequency response is measured using a Dirac pulse emitted by the loudspeaker.

8. The method according to claim 1, wherein the reference frequency response and the present frequency response are respectively averaged over a plurality of individual measurements.

9. The method according to claim 2, wherein the frequency band is 350 Hz to 1.1 KHz.

10. A device for detecting and locating a fault of a housing, comprising:

at least two loudspeakers and at least two microphones for arrangement in an interior of the housing; and a signal generator connected to the loudspeakers and an evaluation circuit connected to the microphones;

wherein the evaluation circuit is configured to:

for each possible pairing of a loudspeaker and microphone: measure a reference frequency response of a sound transmission from the loudspeaker to the microphone of this pairing, for each pairing: measure a present frequency response of a sound transmission from the loudspeaker to the microphone of this pairing at a later point in time, for each pairing: determine a difference frequency response as a difference between the present frequency response of this pairing and the reference frequency response of this pairing, for at least one pairing: determine a detection measure of the difference frequency response of this pairing and, if this at least one detection measure satisfies a predetermined detection criterion:

to detect a fault, and for each possible combination of two pairings: to calculate a correlation measure between the difference frequency responses of this combination, and then to determine the combination with the highest correlation measure and, if the same loudspeaker or the same microphone appears in the two pairings of this combination, then to localize the fault as being closer to this loudspeaker or microphone than to any other loudspeaker or microphone.

11. The device according to claim 10, wherein the correlation measure is determined from a cross-correlation of the difference frequency responses in a selected frequency band.

12. The device according to claim 11, wherein the frequency band is 250 Hz to 2 KHz.

13. The device according to claim 9, wherein the signal generator generates chirps for each loudspeaker.

14. The device according to claim 9, wherein the signal generator generates Dirac pulses for each loudspeaker.

15. The device according to claim 10, wherein the reference frequency response and the present frequency response are respectively averaged over a plurality of individual measurements.

16. The device according to claim 11, wherein the frequency band is 350 Hz to 1.1 KHz.

* * * * *